US007356466B2

(12) United States Patent
Min et al.

(10) Patent No.: US 7,356,466 B2
(45) Date of Patent: Apr. 8, 2008

(54) METHOD AND APPARATUS FOR PERFORMING OBSERVATION PROBABILITY CALCULATIONS

(75) Inventors: Byung-Ho Min, Suwon (KR); Tae-Su Kim, Suwon (KR); Hyun-Woo Park, Suwon (KR); Ho-Rang Jang, Bucheon (KR); Keun-Cheol Hong, Suwon (KR); Sung-Jae Kim, Suwon (KR)

(73) Assignee: Samsung Electronics Co., Ltd., Gyeonggi-di (KR)

( * ) Notice: Subject to any disclaimer, the term of this patent is extended or adjusted under 35 U.S.C. 154(b) by 885 days.

(21) Appl. No.: 10/465,556

(22) Filed: Jun. 20, 2003

(65) Prior Publication Data

US 2004/0002861 A1   Jan. 1, 2004

(30) Foreign Application Priority Data

Jun. 28, 2002   (KR) ................. 10-2002-0037052
Feb. 28, 2003   (KR) ................. 10-2003-0012810

(51) Int. Cl.
*G10L 15/00*   (2006.01)
(52) U.S. Cl. ................. 704/240; 704/238; 704/239
(58) Field of Classification Search ........... 704/242, 704/236–240
See application file for complete search history.

(56) References Cited

U.S. PATENT DOCUMENTS

| 4,227,176 A | * | 10/1980 | Moshier ................. 704/231 |
| 4,227,177 A | | 10/1980 | Moshier |
| 5,636,291 A | | 6/1997 | Bellegarda et al. ......... 382/187 |
| 5,742,928 A | * | 4/1998 | Suzuki ................. 704/239 |
| 5,761,211 A | * | 6/1998 | Yamaguchi et al. ........ 714/707 |
| 5,799,278 A | | 8/1998 | Cobbett et al. ............. 704/256 |
| 5,848,388 A | * | 12/1998 | Power et al. ............... 704/239 |
| 5,864,806 A | * | 1/1999 | Mokbel et al. ............. 704/234 |
| 5,893,058 A | * | 4/1999 | Kosaka .................. 704/254 |
| 5,999,902 A | * | 12/1999 | Scahill et al. .............. 704/240 |
| 6,021,387 A | * | 2/2000 | Mozer et al. .............. 704/232 |
| 6,125,345 A | * | 9/2000 | Modi et al. ................ 704/240 |
| 6,449,591 B1 | * | 9/2002 | Kondo et al. ............... 704/222 |

FOREIGN PATENT DOCUMENTS

DE   28 25 110   11/1979

OTHER PUBLICATIONS

Search Report of the Patent Office Patents Directorate of South Wales, Dec. 1, 2003.
German Office Action, Nov. 8, 1979.
Abstract of U.S. Patent corresponding to DE 2825110, Nov. 8, 1979.

* cited by examiner

*Primary Examiner*—Michael Opsasnick
(74) *Attorney, Agent, or Firm*—Harness, Dickey & Pierce, P.L.C.

(57) ABSTRACT

A method and apparatus for calculating an observation probability includes a first operation unit that subtracts a mean of a first plurality of parameters of an input voice signal from a second parameter of an input voice signal, and multiplies the subtraction result to obtain a first output. The first output is squared and accumulated N times in a second operation unit to obtain a second output. A third operation unit subtracts a given weighted value from the second output to obtain a third output, and a comparator stores the third output for a comparator stores the third output in order to extract L outputs therefrom, and stores the L extracted outputs based on an order of magnitude of the extracted L outputs.

22 Claims, 11 Drawing Sheets

FIG. 4

| Calculation | Pre-processing | | | Mel-filtering & cepstrum | | | | HMM | | Total |
|---|---|---|---|---|---|---|---|---|---|---|
| | Pre-emphasis | Energy calc. | FFT | Mel-filtering | IDCT | Scaling | Cepstr. | Observ. Prob. | State Machine | |
| Multiplication | 160 | 240 | 4,096 | 234 | 288 | 9 | 36 | 43,200 | 0 | 48,263 |
| Addition | 160 | 239 | 6,144 | 202 | 279 | 0 | 1 | 45,600 | 600 | 53,225 |
| Division | 0 | 1 | 0 | 0 | 0 | 0 | 9 | 0 | 0 | 10 |
| Extraction of square root | 0 | 1 | 0 | 0 | 0 | 0 | 0 | 0 | 0 | 1 |
| Log | 0 | 0 | 0 | 32 | 0 | 0 | 0 | 1 | 1 | 34 |
| Total of | 320 | 481 | 10,240 | 468 | 567 | 9 | 46 | 88,801 | 601 | 101,533 |

FIG. 10

| File Process | PercentTime | SelfTime(sec) |
|---|---|---|
| gauss_outP | 23.6 | 2794.51 |
| fast_find_best_codewords | 14.2 | 1683.49 |
| fast_compute_tied_oprob | 12.2 | 1444.23 |
| log_addition | 8.6 | 1014.40 |
| find_best_gaussians | 1.4 | 162.52 |
| Eucledian_distance | 0.5 | 62.52 |
| Compute_output_probability | 0.4 | 48.82 |
| Compute_state_oprob | 0.3 | 36.45 |
| find_overall_best_codewords | 0.1 | 12.87 |
| find_best_codewords | 0.0 | 5.31 |
| compute_discrete_oprob | 0.0 | 3.92 |
| Compute_tied_oprob | 0.0 | 1.50 |
| Total | 61.3 | 7270.54 |

FIG. 11

```
Static float gauss_outP( float *x, float *mean, float *var )
        { float         ftmp, y;
y = *x++ - *mean++;                          /* c1 */
        ftmp = y*y* (*var++);
y = *x++ - *mean++;                          /* c2 */
        ftmp += y*y* (*var++);
y = *x++ - *mean++;                          /* c3 */
        ftmp += y*y* (*var++);
y = *x++ - *mean++;                          /* c4 */
        ftmp += y*y* (*var++);
y = *x++ - *mean++;                          /* c5 */
        ftmp += y*y* (*var++);
y = *x++ - *mean++;                          /* c6 */
        ftmp += y*y* (*var++);
y = *x++ - *mean++;                          /* c7 */
        ftmp += y*y* (*var++);
y = *x++ - *mean++;                          /* c8 */
        ftmp += y*y* (*var++);
y = *x++ - *mean++;                          /* c9 */
        ftmp += y*y* (*var++);
y = *x++ - *mean++;                          /* c10 */
        ftmp += y*y* (*var++);
y = *x++ - *mean++;                          /* c11 */
        ftmp += y*y* (*var++);
y = *x++ - *mean++;                          /* c12 */
        ftmp += y*y* (*var++);
y = *x - *mean;                              /* c13 */
        ftmp += y*y* (*var);
        return ftmp;}
```

US 7,356,466 B2

METHOD AND APPARATUS FOR PERFORMING OBSERVATION PROBABILITY CALCULATIONS

PRIORITY STATEMENT

This application claims the priority of Korean Patent Application No. 2002-37052, filed on Jun. 28, 2002, and Korean Patent Application No. 2003-12810, filed on Feb. 28, 2003, in the Korean Intellectual Property Office, the disclosure of each application incorporated herein in their entirety by reference.

BACKGROUND OF THE INVENTION

1. Field of the Invention

The present invention relates to observation probability calculations for voice recognition.

2. Description of the Related Art

The realm of applications using voice recognition is anticipated to extend to most electronic products normally used in our daily lives. IBM, which was one of the first to propose a technique for utilizing voice recognition, proved the efficiency of a hidden Markov model by applying a hidden Markov model algorithm to voice recognition, as described in U.S. Pat. No. 5,636,291.

The '291 patent discloses a character recognition system applying a hidden Markov model algorithm. The '291 patent organizes the hidden Markov model algorithm into a program implemented by a general-purpose processor.

The voice recognition system disclosed in the '291 patent roughly includes three parts: a pre-processor, a front-end part, and a modeling part. In the pre-processor, the lexemes of all characters of interest are identified. In the front-end part, feature values or parameters, which are comparative, are extracted from recognized lexemes. In the modeling part, a training phase is performed in order to generate a model. The model is used as a standard for precise judgment on the recognized character, based on the extracted feature values or parameters. In addition, based on the recognized lexemes, the modeling part determines which character among pre-assigned characters should be selected as a recognized character.

IBM has also published a voice recognition system and method using a widely-used hidden Markov model algorithm. U.S. Pat. No. 5,799,278 discloses a voice recognition system and method in which isolated voiced words are recognized using a hidden Markov model algorithm. The voice recognition system and method in the '278 patent is trained to recognize phonetically dissimilar words, and is suitable for recognizing a substantial number of words.

The voice recognition systems described above require substantial processing time to execute calculations necessary for voice recognition. An observation probability calculation used in these systems occupy about 62% of the total number of calculations required by a voice recognition device using a hidden Markov model algorithm.

SUMMARY OF THE INVENTION

An exemplary embodiment of the present invention is directed to an apparatus for calculating an observation probability in order to perform voice recognition of a spoken word. The apparatus includes a first operation unit that subtracts a mean of a first plurality of parameters of an input voice signal from a second parameter of an input voice signal, and multiplies the subtraction result to obtain a first output. The first output is squared and accumulated N times in a second operation unit to obtain a second output. A third operation unit subtracts a given weighted value from the second output to obtain a third output, and a comparator stores the third output for a comparator stores the third output in order to extract L outputs therefrom, and stores the L extracted outputs based on an order of magnitude of the extracted L outputs.

Another exemplary embodiment of the present invention is directed to a method of calculating an observation probability, where a mean of a first plurality of parameters of an input voice signal is subtracted from a second parameter that is extracted from the input voice signal to obtain a result. The result is multiplied to obtain a first output. The first output is squared and accumulated to obtain an observation probability value.

Another exemplary embodiment of the present invention is directed to a method of recognizing a voice signal, where a mean of a first plurality of parameters of an input voice signal is subtracted from a second parameter that is extracted from the input voice signal to obtain a result. The result is multiplied to obtain a first output. The first output is squared and accumulated to obtain a second output. A given weighted value is subtracted from the second output to obtain a third output. From the third output, L outputs may be extracted, and one or more L outputs having a greatest order of magnitude, are selected as corresponding to a recognized voice signal.

BRIEF DESCRIPTION OF THE DRAWINGS

The above and other features and advantages of the exemplary embodiments of the present invention will become more apparent by describing exemplary embodiments in detail thereof with reference to the attached drawings, in which:

FIG. 4 illustrates the number of calculations required to perform voice recognition in accordance with the exemplary embodiments of the present invention;

FIG. 10 is a table showing the number of calculations for each of the functions necessary for a Hidden Markov model algorithm;

FIG. 11 shows the algorithm of the first expression included in Equation 8; and

DETAILED DESCRIPTION OF EXEMPLARY EMBODIMENTS

Exemplary embodiments of the present invention are directed to an observation probability calculation apparatus and method of calculating an observation probability for voice recognition. The method and apparatus use a hidden Markov model algorithm to efficiently perform an observation probability calculation. The observation probability calculation apparatus may improve the speed at which voice recognition is performed. The observation probability calculation apparatus may reduce the number of instructions by about 50% or more, as compared to instructions used in the prior art. Thus, operations can be processed at a potentially lower clock speed than in the prior art, and the amount of power consumed may be reduced to half that in the prior art.

Further, the observation probability calculation apparatus may include dedicated hardware to perform the observation probability calculation. The observation probability calculation typically occupies the greatest amount of the hidden Markov model algorithm. Thus, processing speed of a voice recognition device containing the observation probability calculation apparatus may be increased, in an effort to reduce power consumption.

Figure 1:
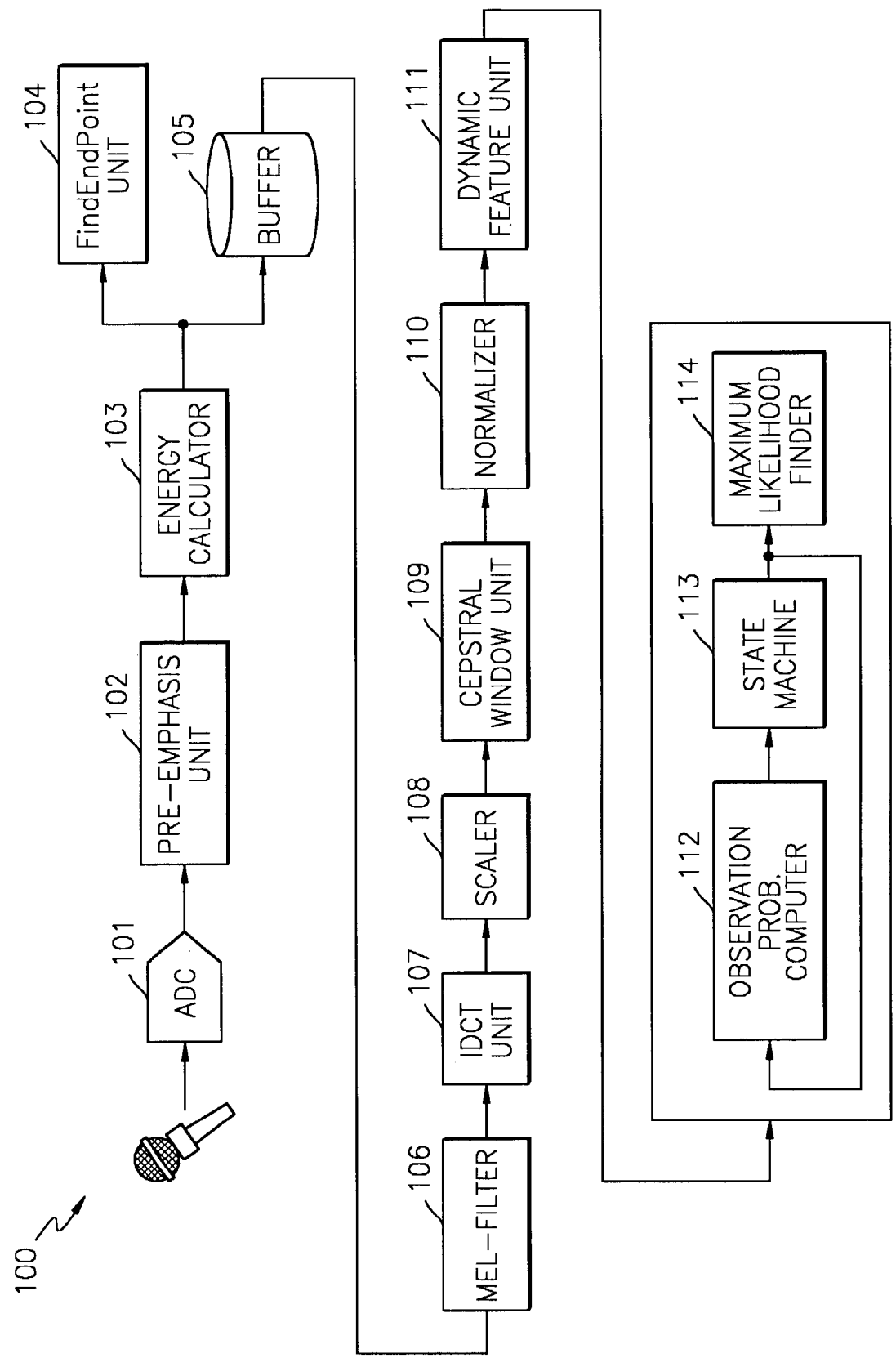
FIG. 1 is a block diagram of a general voice recognition system.

FIG. 1 is a block diagram of a general voice recognition system. In the general voice recognition system 100 of FIG. 1, an analog-to-digital converter (ADC) 101 may convert a sequential (analog) voice signal into a digital voice signal. A pre-emphasis unit 102 may emphasize a high-frequency component of the digital voice signal in order to emphasize clearly distinct pronunciations. The digital voice signal may be divided and sampled in units of a given number of samples. The digital voice signal may be divided in units of 240 samples (30 ms) for example.

Since cepstrum (which is a parameter used in Hidden Markov Model algorithms) and energy produced from a frequency spectrum are generally used as feature vectors in a Hidden Markov model, the cepstrum and energy are calculated by an energy calculator 103. In order to obtain energy, the energy calculator 103 calculates instantaneous energy for 30 ms using an energy calculation formula in the timing domain. The energy calculation formula, where "Y(i)" represents energy, is shown in Equation 1:

$$Y(i) = \sqrt{\frac{\sum_{j=0}^{239} (X(W\_RATE \cdot i + j))^2}{W\_SIZE}}, \ 0 \leq i \leq 29, \text{ where} \quad (1)$$

W_SIZE = 240;

W_RATE = 80.

In Equation 1, "i" is the number of frames (30 frames calculated for Equation 1), "X" represents digitized voice data, "j" is the index of data for one frame, W_SIZE means that every frame is composed of 240 data, and W_RATE is the number of overlapped data. An energy value calculated by Equation 1 may be used to determine whether a current input signal is a voice signal or noise. In order to calculate a spectrum in the frequency domain, Fast Fourier Transform (FFT) may be used. For example, the spectrum in the frequency domain may be calculated using a 256-point complex FFT operation. The 256-point complex FFT operation can be expressed by Equation 2:

$$X(k) = \sum_{n=0}^{255} \left[ x(n)\cos\left(\frac{2\pi kn}{256}\right) + y(n)\sin\left(\frac{2\pi kn}{256}\right) \right] + \quad (2)$$

$$j \cdot \sum_{n=0}^{255} \left[ y(n)\cos\left(\frac{2\pi kn}{256}\right) - x(n)\sin\left(\frac{2\pi kn}{256}\right) \right]$$

In Equation 2, X(k) is a result of a Fast Fourier Transform (FFT) at k, "k" being a value between 0 and 255. The terms x(n) and y(n) are real numbers used in the FFT. If the energy calculation result indicates that the current input signal is a voice signal based on the energy calculation result, the beginning and end of the input voice signal is determined in a FindEndPoint unit 104. In this way, if an effective word defined by the beginning and end of the input voice signal is determined, only spectrum data corresponding to the determined effective word is stored in a buffer 105. In other words, buffer 105 stores only an effective voice signal, which is obtained by removing noise from a word spoken by a speaker.

A mel-filter 106 performs mel-filtering, which is a pre-processing step for obtaining a cepstrum from a spectrum by filtering the spectrum in bandwidth units of 32 bands. Thus, a spectrum for 32 bands may be calculated using mel-filtering. By transforming the calculated spectrum in the frequency domain into the timing domain, a cepstrum, which is a parameter used in hidden Markov models, may be obtained. The transformation of the frequency domain into the timing domain may be done using an Inverse Discrete Cosine Transform (IDCT) in an IDCT unit 107.

Since there may be a substantial difference (i.e., about $10^2$) between the obtained cepstrum and energy values (e.g., values used in a search that employs a hidden Markov model), the obtained cepstrum and energy values may need to be adjusted. This adjustment may be performed using a logarithmic function in a scaler 108.

A cepstral window unit 109 separates periodicity and energy from the mel-cepstrum value and improves noise characteristics using Equation 3 to determine a new cepstrum value Y[i][j]:

$Y[i][j]=Sin\_TABLE[j] \cdot X([i][j+1])$ here,
  $0 \leq i < NoFrames, \ 0 \leq j \leq 7$ \qquad (3)

where NoFrames denotes the number of frames. Sin_TABLE can be obtained using Equation 4:

$$Sin\_TABLE[j] = i + 4 \cdot Sin\left(\frac{\pi \cdot (j+1)}{8}\right), 0 \leq j \leq 7. \quad (4)$$

In Equations 3 and 4, "i" represents the number of frames and "j" is the number of cepstrum. A normalizer 110 normalizes energy values, which are contained in each frame (such as in the ninth location in each frame, for example), into values existing within a given range. To achieve normalization, the maximum energy value initially may be searched from among the ninth data of each frame using Equation 5:

$$MaxEnergy = \max_{0 \leq i \leq NoFrames} WindCepstrum[i][8]. \quad (5)$$

Then, normalized energy ('NECepstrum') can be obtained by subtracting the maximum energy value from the ninth energy data of all frames, as shown in Equation 6:

NECepstrum[i][8]=(WindCepstrum[i][8]−MaxEnergy)·WEIGHT_FACTOR where $0 \leq i \leq$ NoFrames In Equations 5 and 6, 'i' represents the number of frames; 'NoFrames' is the maximum number of frames, 'WindCepstrum' is a value obtained by using the Sin_Table, and 'WEIGHT_FACTOR' is a weighted value. A recognition rate for a voice signal is generally heightened by increasing the type of parameters (feature values). To do this the feature value of each frame may be considered a first type of feature, and the difference between the feature values of frames may be considered a second type of feature, called delta cepstrum.

A dynamic feature unit 111 may calculate the delta cepstrum Rcep(i), or difference between feature values, and as a second feature value using Equation (7).

Rcep(i)=F(i)=(−1/√10)*(2·Scep[i+4][j]+1·Scep[i+3][j]+0·Scep[i+2][j]−1·Scep[i+1][j]−2·Scep[i][j])

where $0 \leq i \leq$ NoFrames+1, and $0 \leq j \leq 9$.

In Equation (7), 'i' is the number of frames, 'j' is the number of cepstrum, F(i) represents an abbreviation for a feature value, and Scep is the normalized energy NECepstrum. Each operation is generally performed on two adjacent frames. A number of delta cepstrums equal to the number of cepstrums calculated are obtained using Equation (7). Thus, feature values that are to be used as comparatives in a word search conducted by a hidden Markov model may be extracted.

Based on the extracted feature values, a word search using a given hidden Markov model may be performed. A first step is performed in an observation probability computer 112. Word search and word determination are based on probabilities, i.e., syllables having the greatest probability values are searched for and determined.

The types of probabilities may include an observation probability and a transition probability. These probabilities may be accumulated, and a sequence of syllables having the greatest probabilities may be selected as a recognized voice. The observation probability o_prob[m] can be obtained using Equation 8:

$$y = \sum_{i=0}^{1} \sum_{j=0}^{12} \text{var}[i][j](\text{Feature}[i][j] - \text{Mean}[i][j])^2 \quad (8)$$

$$dbx = y + G\text{const}$$

$$o\_prob[m] = \max_{0 \leq i \leq mixture} \{abx[i]\}.$$

In Equation (8), dbx denotes a probabilistic distance between a reference mean value (Mean) and a feature value (Feature) extracted from an input voice signal. As the probabilistic distance becomes smaller, the observation probability increases. Feature denotes a parameter extracted from the input voice signal, Mean represents the mean of a plurality of parameters extracted from representative phonemes of the input voice signal, var represents a distribution degree of the mean. Gconst is a weighted value, and i represents a "mixture" of representative types of phonemes.

Representative phoneme values of many people increase the accuracy of voice recognition and are classified into several groups, each having similar phoneme types. Parameter "i", denotes a factor that represents a representative value for each group, and "j" denotes the number of parameters. The number of frames may vary depending on the type of word, and the mixture (i.e., "i") can be classified into a variety of groups according to the style of people's pronunciation of a word.

The calculated observation probabilities indicate that the phonemes of a pre-selected word can be observed. The phonemes each have different observation probability values. After an observation probability value is determined for each phoneme, the determined observation probability values may be processed by a state machine 113 to obtain a sequence of most appropriate phonemes. In a hidden Markov model used to recognize an independent word, the state machine 113 may be understood as a sequence of feature values of each of the phonemes of a spoken word to be recognized.

Figure 2:
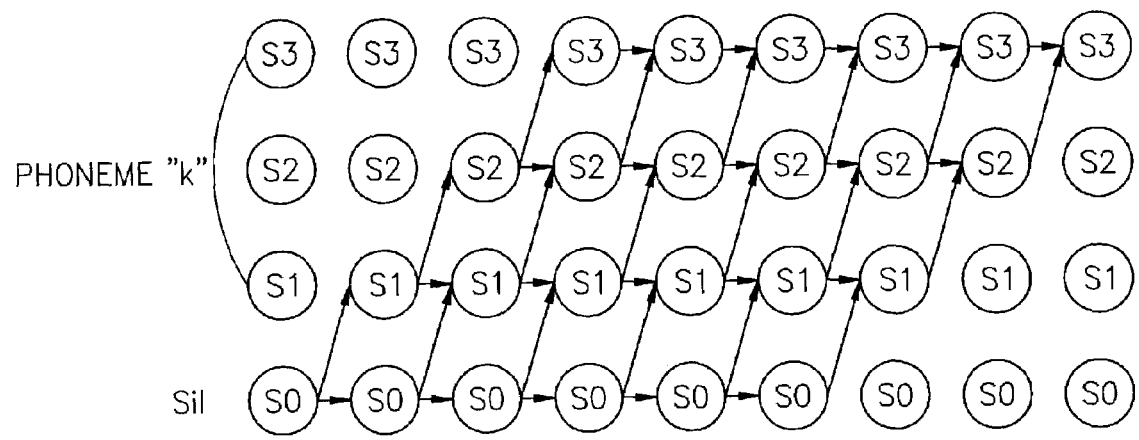
FIG. 2 illustrates a method of obtaining state sequences for a phoneme.

FIG. 2 illustrates a method of obtaining a state sequence of an exemplary phoneme "k". In FIG. 2, for example, if phoneme "k" consists of three sequential states S1, S2, and S3, a state starts from an initial state S0, passes states S1 and S2, and reaches state S3. In FIG. 2, a right movement on the same state level represents a delay. The delay may depend on the particular speaker. In other words, the phoneme "k" may be voiced for a substantially short period of time, or for a relatively long period of time. As the time at which a phoneme is voiced lengthens, the delay on each state level lengthens. Accordingly, the phoneme "k" can be represented in a variety of state sequences, as shown in FIG. 2, and a probability calculation may be performed on each of the state sequences, for each phoneme of an input voice signal.

After probability calculations on the individual state sequences of each phoneme are completed, calculated probability values for each phoneme may be stored in state machine 113. State level may be advanced by obtaining what is referred to as an "Alpha" value, or probability for each state, while selecting the greatest branch, or greatest probability. In FIG. 2, the term "Sil" denotes a silent sound.

An Alpha value may be obtained using a previous observation probability value (which is actually an accumulation of observation probability values), and using an inter-phoneme transition probability value obtained through prior experiments, according to Equation 9:

$$\text{State}[i] \cdot \text{Alpha} = \max_{0 \leq i < 277} \text{State}[i] \cdot \text{Alpha\_prev} + \text{State}[i] \cdot \text{trans\_prob}[0], \quad (9)$$

$$\text{State}[i-1] \cdot \text{Alpha\_prev} + \text{State}[i] \cdot \text{trans\_prob}[1] + *(\text{State}[i] \cdot \text{o\_prob})$$

In Equation 9, State.Alpha denotes a newly calculated probability value accumulated to a previous probability value, State.Alpha_prev denotes a previous probability value which is an accumulation of previous probability values, state.trans_prob [0] denotes the probability that a state Sn transits to the state Sn (e.g., S0→S0), state.trans_prob [1] denotes the probability that state Sn transits to a state Sn+1 (e.g., S0→S1), and state.o_prob denotes an observation probability calculated in a current state.

A maximum likelihood finder 114 selects a recognized word based on final accumulated probability values of individual phonemes, as calculated in Equation 9. A word having the greatest probability may be selected as the recognized word.

A process of recognizing a spoken word "KBS" will now be described to illustrate how a word having the greatest probability may be selected as the recognized word. The spoken word "KBS" consists of three syllables corresponding to "këj", "bï", and "es". The syllable "këj" consists of three phonemes corresponding to "k", "ë", and "j", the syllable "bï" consists of two phonemes corresponding to "b" and "ï", and the syllable "es" consists of two phonemes corresponding to "e" and "s".

The spoken word "KBS" consists of seven (7) phonemes of "k", "ë", "j", "b", "ï", "e" and "s" and is recognized based on observation probability values for each of the seven (7) phonemes and inter-phoneme transition probability values. That is, in order to recognize the spoken word "KBS", the seven phonemes must be recognized as much correctly as possible, and a sequence of correctly-recognized phonemes must be selected as the most similar word to the word "KBS".

Initially, observation probabilities are calculated for each of the phonemes of an input voice signal (KBS). To do this, the similarity degree (i.e., a probability) between each of the phonemes of the input voice signal to each of representative phonemes stored in a database is calculated, and the greatest probability of a representative phoneme is determined as an observation probability for each phoneme. For example, the phoneme "k" is compared with each of the representative phonemes stored in the database, and a representative phoneme "k" having the greatest probability is selected.

After the observation probability calculations, the input voice signal may be applied to a state machine that consists of the determined representative phonemes. Hence, the most appropriate sequence of phonemes may be determined.

The state machine consists of seven phonemes "k", "ë", "j", "b", "ï", "e", and "s". The word "KBS" is selected based on those phonemes that have the greatest observation probability, and where an accumulation of the observation probabilities is maximum selected. Each of the seven phonemes may be composed of three states.

Figure 3:
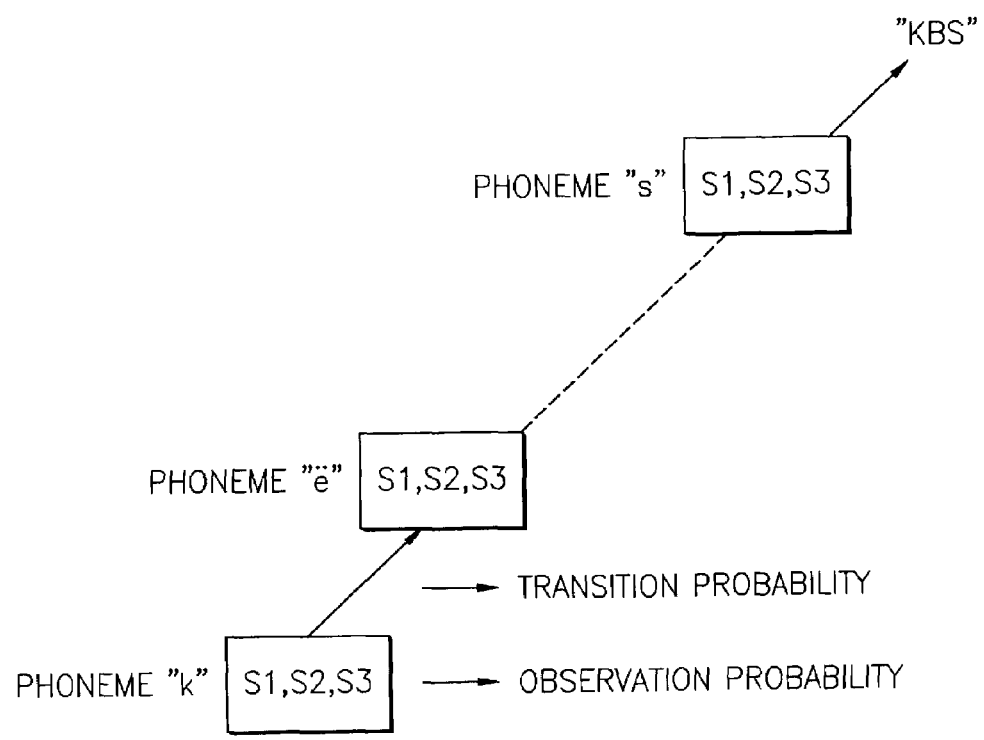
FIG. 3 illustrates a word recognition process.

FIG. 3 illustrates a word recognition process. In order to recognize the word "KBS", the observation probability computer 112 computes an observation probability for each of the seven phonemes, "k", "ë", "j", "b", "ï", "e", and "s", and the state machine 113 selects a word "KBS" having the greatest observation probability for each phoneme and the greatest accumulation of observation probabilities.

In many existing voice recognition products, the above-described operations are generally designed in software (C/C++ language) or an assembly code implemented by a general-purpose processor. Alternatively, the above operations may be performed by dedicated hardware, i.e., an application specific integrated circuit (ASIC). A software implementation may require longer calculation time than hardware, but is more elastic, so as to more easily change operations. An ASIC may increase the processing speed and consumes less power than software. However, because the ASIC is not elastic, operations may not be changed as easily as in a software implementation. Accordingly, the observation probability calculation apparatus that is suitable for voice recognition products in accordance with the exemplary embodiments of the present invention employs software to expedite data processing.

FIG. 4 illustrates the number of calculations required to perform voice recognition in accordance with the exemplary embodiments of the present invention. In the case that software is implemented by a general-purpose processor, such as a digital signal processor or any Intel Pentium microprocessor, for example, the number of calculations required to perform each of the functions necessary for general voice recognition is shown in FIG. 4. In FIG. 4, the number of calculations is not the number of instructions, but the number of times (i.e., iterations) of calculations, such as multiplication, addition, log operation, exponential operation, etc. As can be seen from FIG. 4, the total number of calculations necessary for general voice recognition is about 100,000, where about 88.8% is dedicated to observation probability calculations.

Table 1 shows the number of instructions used when general voice recognition is performed using an ARM processor.

TABLE 1

| Function | Cycle number of instructions | Percentage |
| --- | --- | --- |
| Observation probability calculation (HMM) | 22,467,200 | 61.7% |
| State machine updating | 11,183,240 | 30.7% |
| FFT | 910,935 | 2.50% |
| Maximum likelihood finding | 531,640 | 1.46% |
| Mel-filtering/IDCT/Scaling | 473,630 | 1.30% |
| Dynamic feature determination | 283,181 | 0.78% |
| Pre-emphasis & energy calculation | 272,037 | 0.75% |
| Cepstral window & normalization | 156,061 | 0.43% |
| End point finding | 123,050 | 0.30% |
| Total | 36,400,974 | 100.00% |

Referring to Table 1, a total of approximately 36 million instructions are required to perform voice recognition. About 22 million instructions, or 62%, are used for a hidden Markov model (HMM) search, that is, the observation probability calculation. As in Table 1, the cycle number of instructions, is not the number of instructions but the number of times of calculations, such as, addition, multiplication, log operation, exponential operation, etc.

A hardware device may be constructed to perform the observation probability calculation which uses the greatest number of instructions, thereby increasing the calculation speed and reducing power consumption. The exemplary embodiment of the present invention also provides an observation probability calculation apparatus dedicated to calculate observation probabilities with a small number of instructions, that is, a small number of cycles.

A probabilistic distance calculation, which occupies a substantial part of the observation probability calculation, is expressed in Equation 10:

$$dx_0[i] = lw - \frac{\sum_{j=0}^{8} p[i][j] \cdot (m[i][j] - \text{Feature}[k][0][j])^2}{2} \quad (10)$$

$$dx_1[i] = lw - \frac{\sum_{j=0}^{8} p[i][j] \cdot (m[i][j] - \text{Feature}[k][1][j])^2}{2}$$

In Equation (10), m denotes the mean of parameters, Feature denotes a parameter extracted from an input signal, p denotes a Precision value that represents a distribution degree (dispersion, $1/\sigma^2$), lw stands for "log weight" and is a weighted value, i is a "mixture" of representative types of phonemes, and j is the number of cepstrum. The log weight decreases while a weighted value calculation in a linear domain is changing into a weighted value calculation in a log domain.

In order to improve the efficiency of an observation probability calculation, the present invention also provides a device that performs a calculation similar to Equation 10, in order to express the probabilistic distance calculation using only one instruction, as indicated in the following expression (11).

$$\frac{p[i][j] \cdot (\text{mean}[i][j] - \text{feature}[k][j])^2}{2}$$

In expression (11), p[i][j] denotes a precision which represents a degree of distribution (dispersion, $1/\sigma^2$), mean [i][j] denotes a mean value of phonemes, and feature [k][j] denotes a parameter for a phoneme, that is, energy or cepstrum. In expression (11), mean [i][j]−feature [k][j] denotes the probabilistic difference (distance) between the parameter of an input phoneme and a pre-defined representative parameter. The result of mean [i][j]−feature [k][j] is squared to calculate an absolute probabilistic distance. The square of mean [i][j]−feature [k][j] is multiplied by the dispersion to predict an objective real distance between the input phoneme parameter and the predefined representative phoneme parameter. Here, the representative phoneme parameters are empirically obtained from many voice data. As the number of voice data samples obtained from a variety of people increase, the recognition rate is improved.

However, the present invention can maximize the recognition rate by performing an operation such as expression 12. Expression (12) accounts for the restrictive characteristics of hardware, that is, the characteristic that the width of data may be generally limited to 16 bits:

$$\{P[i][j] \cdot (\text{mean}[i][j] - \text{feature}[k][j])\}^2$$

In expression (12), p[i][j] denotes a distribution degree $1/\sigma$, which is different from the dispersion $1/\sigma^2$ in expression (11). The reason why the distribution degree $1/\sigma$ is used instead of the dispersion degree $1/\sigma^2$ is described below.

In expression (11), m[i][j]−feature [k][j] is squared, and the square of m[i][j]−feature[k][j] is multiplied by p[i][j]. However, in expression (12), m[i][j]−feature[k][j] is multiplied by p[i][j], and the multiplication result is squared. Also, in expression (11), a high bit resolution (as much as the square of m[i][j]−feature[k][j]) is required to express p[i][j]. However, in expression (12), only a bit resolution of m [i][j]−feature [k][j] is required. In other words, in order to maintain a 16-bit resolution, expression (11) requires 32 bits to express p[i][j], while expression (12) requires only 16 bits to express p[i][j]. In expression (12), since the result of p[i][j]·(mean[i][j]−feature[k][j]) is squared, a similar effect to the calculation of Equation (9) using $1/\sigma^2$ can be obtained.

Figure 5:
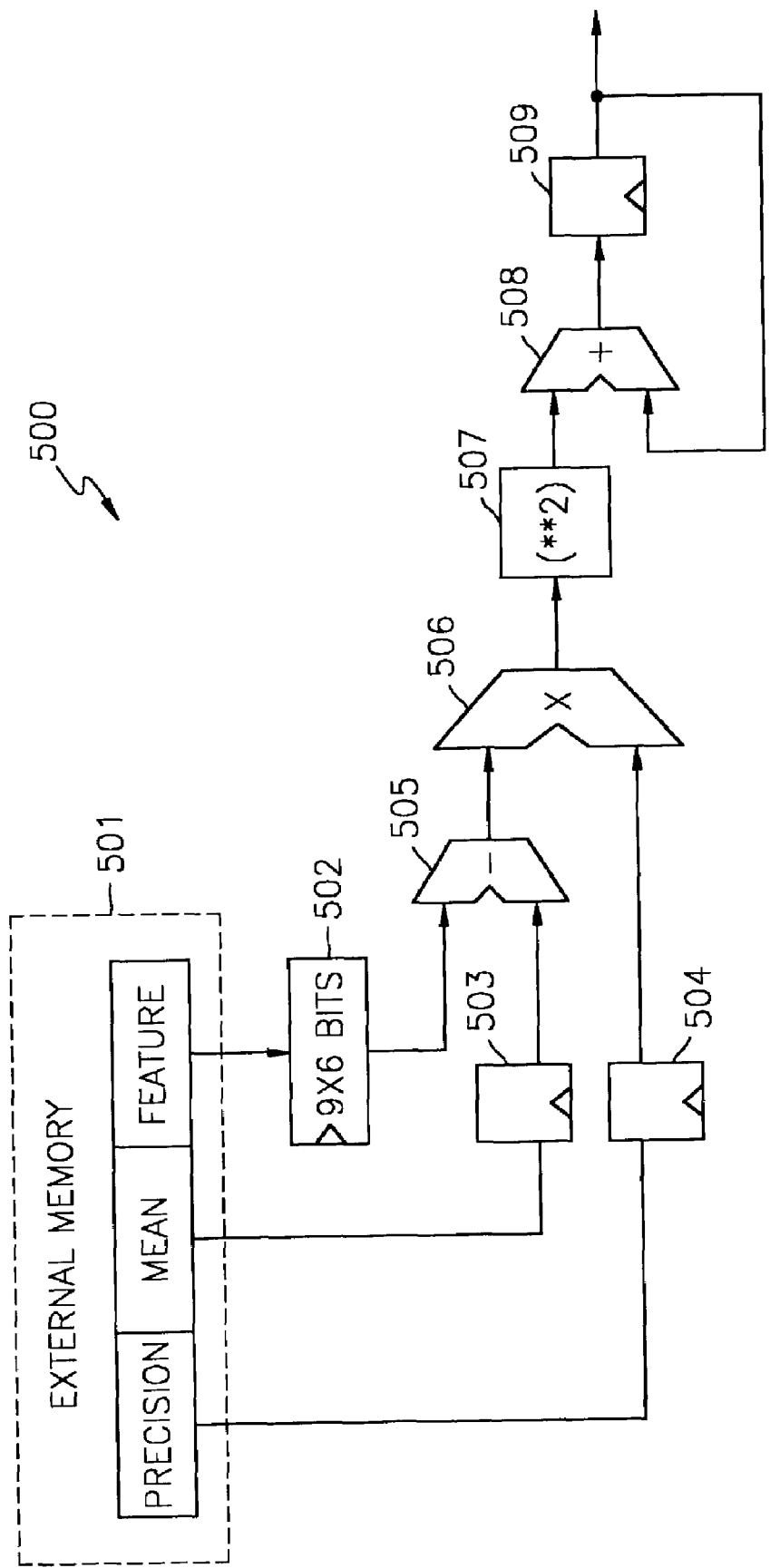
FIG. 5 is a block diagram of an observation probability calculation apparatus in accordance with the exemplary embodiments of the present invention.

FIG. 5 is a block diagram of an observation probability calculation apparatus. The observation probability calculation apparatus 500 includes a subtracter 505, a multiplier 506, a squarer 507 and an adder 508. Reference numerals 502, 503, 504, and 509 are registers.

An external memory 501, which may be embodied as a database, for example, stores the precision, mean, and feature of every representative phoneme. Here, precision denotes a distribution degree ($1/\sigma^2$), mean denotes a mean of the parameters (energy & cepstrum) of each of the representative phonemes, and feature[k][j] denotes the parameters (energy & cepstrum) of each phoneme.

Initially in the observation probability calculation apparatus 500, the subtracter 505 calculates the difference between a mean and a feature. Then, the multiplier 506 multiplies the difference by a distribution degree ($1/\sigma^2$) to obtain a real distance between a mean and a feature. Next, the squarer 507 squares the result of the multiplication to obtain an absolute difference (i.e., a real difference) between a mean and a feature. Thereafter, the adder 508 adds the square to the previous parameter. That is to say, a result of expression (12) is obtained by the squarer 507, and a result of a calculation in Equation (9) is obtained by the adder 508.

The external memory 501 stores p[i][j], mean[i][j], and feature[k][j] in registers 502, 503, and 504 in a given sequence. The given sequence corresponds to a sequence in which i and j sequentially increase. While alternating i and j, p[i][j], mean[i][j], and feature[k][j] are sequentially provided to the registers 502, 503, and 504. The register 509 obtains a final accumulated observation probability.

According to this probability accumulation calculation, a representative phoneme which is the most probabilistically similar to an input phoneme has the greatest probability. The registers 502, 503, 504, and 509 at the front and rear ends of the observation probability calculation apparatus 500 may be used to stabilize data.

In the observation probability calculation apparatus 500, the bit resolution of data may vary, depending on the processor structure. As the number of bits increase, a more accurate result can be calculated. However, since the bit resolution relates to the size of the observation probability calculation apparatus 500, an appropriate resolution must be selected in view of the recognition rate.

Figure 6:
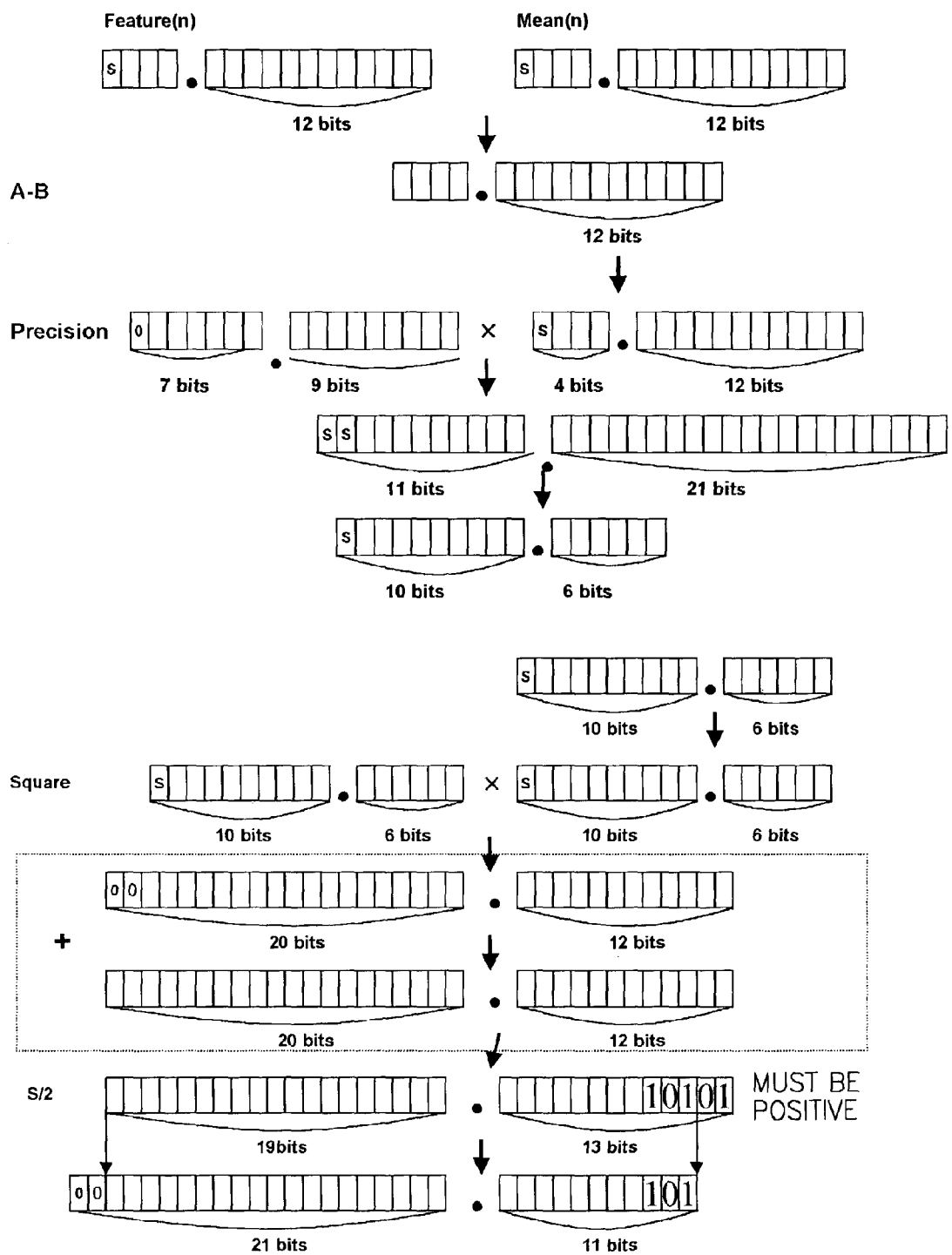
FIG. 6 illustrates selection of a bit resolution.

In order to facilitate understanding of selection of bit resolution, FIG. 6 shows an internal bit resolution of a processor with a 16-bit resolution. Here, a cutting process in each step shown in FIG. 6 is based on a characteristic of data width being limited to 16 bits. Occasional reference should also be made to FIG. 5. The cutting process corresponds to a selection process for preventing a degradation of performance. The processing speed may be substantially increased when the observation probability calculation apparatus 500 is used, as compared to a case when only a general purpose processor is used.

The feature and the mean each may be composed of a 4-bit integer and a 12-bit decimal. The mean is subtracted from the feature in subtracter 505 to obtain a value composed of a 4-bit integer and a 12-bit decimal. A precision may be composed of a 7-bit integer and a 9-bit decimal. The precision is multiplied by the output of subtracter 505 at multiplier 506 to obtain a value composed of a 10-bit integer and a 6-bit decimal. The output of multiplier 506 is squared in squarer 507 to obtain a value composed of a 20-bit integer and a 12-bit decimal. This value is added to the previous value in adder 508, and the sum is scaled to obtain a value composed of a 21-bit integer and an 11-bit decimal.

Table 2 shows a results comparison between a voice recognition algorithm based on a widely-used hidden Markov model implemented by a general ARM-series processor, and a voice recognition HMM algorithm performed by a dedicated processor adopting the observation probability calculation apparatus in accordance with the exemplary embodiments of the present invention.

TABLE 2

| Processor | Number of cycles | Time (20M CLK) |
|---|---|---|
| General-purpose ARM processor | 36,400,974 | 1.82 s |
| Dedicated processor adopting observation probability calculation apparatus of present invention | 15,151,534 | 0.758 s |

As shown in Table 2, the general-purpose ARM processor performs voice recognition at about 36 million cycles, while the dedicated processor perform voice recognition in about 15 million cycles, or about half the number of cycles iterated by the general-purpose ARM processor. Thus, real-time voice recognition is almost possible. In other words, the dedicated processor has the same performance as the general-purpose processor even at a substantially low clock frequency. Hence, power consumption may be greatly reduced.

By reference, the relationship between the amount of power consumed and a clock frequency can be expressed by Equation (13):

$$P = \frac{1}{2} \cdot C \cdot f \cdot V \quad (13)$$

where P denotes the amount of power consumed, C is a capacitance of a component of a circuit, and f denotes the degree of an entire transition of a signal within the circuit. The transition degree depends on a clocking speed. V represents a supplied voltage. Accordingly, if the clocking speed is reduced by half, the amount of power consumed is also halved, i.e., docking speed is proportional to consumed power.

In the observation probability calculation apparatus 500, external memory 501 stores a mean, transition probabilities, parameters that are extracted from an input voice signal and a distribution degree of experientially-obtained representative phonemes, which are different according to individual people's pronunciation style. These data are stored initially in registers 502, 503, and 504 to minimize a change in a signal due to changes in external data. The storage of data closely relates to power consumption. Among the data stored in the internal registers 502, 503 and 504, the difference between the parameter (feature) extracted from the input voice signal and the pre-stored mean value is obtained by subtracter 505.

In multiplier 506, the difference is multiplied by a precision, which denotes the distribution degree ($1/\sigma^2$). The multiplication result is squared at squarer 507 to obtain a substantial probabilistic distance. Since the substantial probabilistic distance corresponds to only a temporally-current parameter among many voice parameter frames forming a word, the substantial probabilistic distance is added to the previous probabilistic distance in adder 508 so as to accumulate probabilistic distance values. Data stored in register 509 is fed back to the adder 508 to perform this accumulation, so that the data is used in the next calculation.

Register 509 is not only used for accumulation, but is also used to minimize a signal transition. The accumulation may be applied equally to the pre-determined representative phonemes, and the resultant accumulated values may be stored in different storage locations for different phonemes or states. After accumulations with respect to all parameters of the input voice signal are completed, the greatest accumulation value for each phoneme may be recognized as the most probabilistically similar phoneme to an input phoneme. A final recognized word may be determined using the accumulation values in an existing processor.

Figure 7:
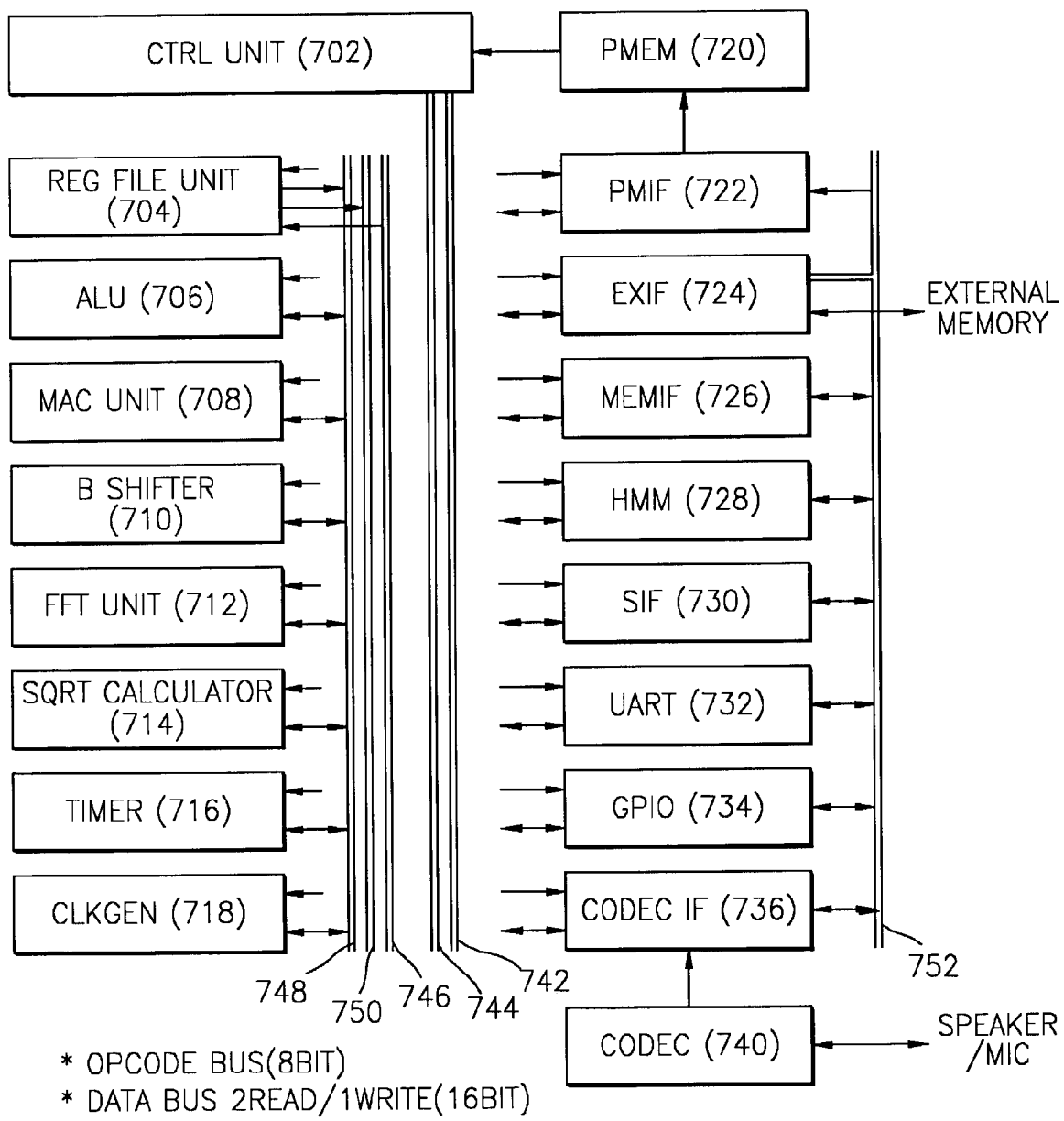
FIG. 7 is a block diagram of a voice recognition device in accordance with the exemplary embodiments of the present invention.

FIG. 7 is a block diagram of a voice recognition device which adopts an observation probability calculation apparatus. The voice recognition device 700 may adopt a 3-bus system as a special purpose processor for speaker-independent voice recognition, for example. The observation probability calculation device may be installed within a HMM module 728, with constituent modules sharing two 8-bit OPcode buses for 3 data buses (two 16-bit read buses and one 16-bit write bus). This is only an exemplary configuration, as other combinations at bus architectures may be used, as is readily apparent to one skilled in the art.

Referring to FIG. 7, a control (CTRL) unit 702 may be embodied as a general-purpose processor. A REG file unit 704 denotes a module for performing a register filing operation. An arithmetic logic unit (ALU) 706 represents a module for performing an arithmetic logic. A Multiplication and Accumulation (MAC) unit 708 is a module for performing MAC. A barrel (B) shifter 710 may represent a module for performing a barrel shifting operation. A fast Fourier Transform (FFT) unit 712 may perform a FFT calculation. A square root (SORT) calculator 714 may perform a square root calculating operation. A timer 716 institutes a timer function, and a clock generator (CLKGEN) 718 may generate a clock signal. The CLKGEN 718 receives a clock signal generated within, or external, from the observation probability calculation apparatus 500 of FIG. 5, and generates a clock signal input to the elements of the observation probability calculation apparatus 500. In particular, the CLKGEN 718 controls a clock speed in order to achieve a low power consumption.

The voice recognition device 700 may further include a program memory module (PMEM) 720, a program memory interface module (PMIF) 722, an external interface module (EXIF) 724, a memory interface module (MEMIF) 726, a hidden Markov model calculation module (HMM) 728, (which may be the observation probability calculation apparatus 500, for example), a synchronous serial interface module (SIF) 730, and a universal asynchronous receiver/transmitter module (UART) 732. Further, voice recognition device 700 may include a general-purpose input/output module (GPIO) 734, a codec interface module (CODEC IF) 736, and a module for performing a CODEC operation (CODEC) 740. HMM 728 may perform a word search using a hidden Markov model that is based on feature values, and an external bus 752 interfaces data with an external memory such as EXIF 724, which may support a dynamic memory access (DMA).

A controller (decoder), not shown in FIG. 7, may be built in each of the constituent modules to receive commands via dedicated command (OPcode) buses 748 and 750. The controller also decodes the received commands. That is, a controller built in the HMM 728 receives a command via control OPcode buses 748 and 750, decodes the command, and controls the observation probability calculation apparatus 500 to perform observation probability calculations. Data may be provided via two read buses 742 and 744, and output via a write bus 746, for example. Programs may be loaded in the PMEM 720 via the EXIF 724.

The HMM 728 receives a control command from control unit 702 via the two OPcode buses 748 and 750. An internal controller (not shown) in HMM 728 decodes the control command and controls the observation probability calculation device 500 to perform observation probability calculation.

Figure 8:
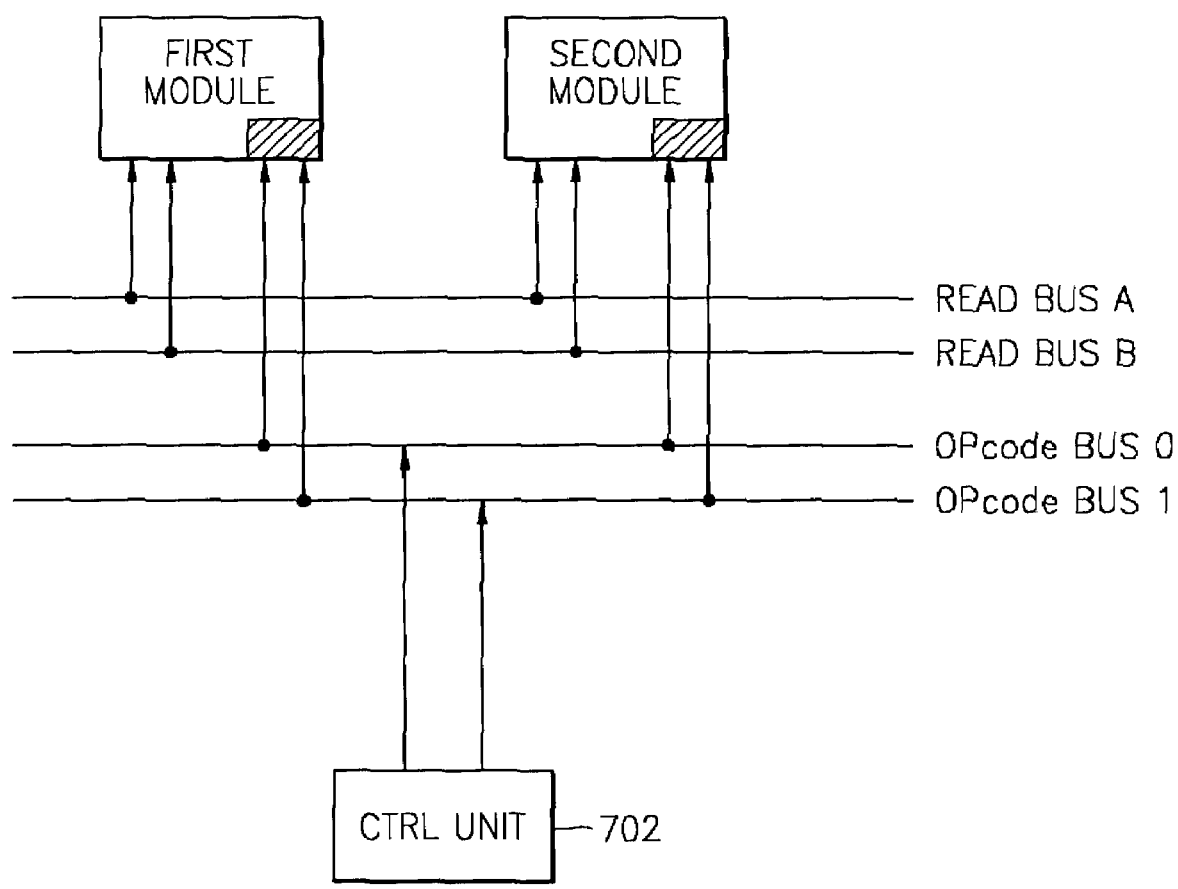
FIG. 8 is a block diagram illustrating a process of receiving a control command and data in the voice recognition device of FIG. 7.

FIG. 8 is a block diagram illustrating a process of receiving a control command and data in the voice recognition device 700. The control unit 702 may directly decode a control command and controls the constituent modules to execute an operation designated in the control command. Alternatively, the control unit 702 passes a control command to a constituent module via OPcode buses 0 and 1 (OPcode buses 748 and 750) and indirectly controls the operation of each of the constituent modules. The constituent modules share OPcode buses 1 and 2 and read buses A and B.

For example, to directly control execution of an operation, the control unit 702 fetches a control command from PMEM 720, decodes the control command, reads an operand (data to be operated) necessary for an operation designated in the control command, and stores the read data in REG file unit 704. Thereafter, if the designated operation is a control logic operation, it is performed in ALU 706. If the designated operation is a multiplication and accumulation, it is performed in MAC unit 708. If the designated operation is a barrel shifting operation, it is performed in B shifter 710. If the designated operation is a square root extraction, it is performed in the SQRT extractor 714. The results of the designated operations are stored in REG file unit 704.

To indirectly control the execution of an operation, the control unit 702 may use the OPcode buses 0 (748) and 1 (750). The control unit 702 sequentially applies a control command fetched from PMEM 720 to OPcode buses 0 (748) and 1 (750) without decoding the fetched control command.

The control command is initially applied to OPcode bus 0 (748), and then applied to the OPcode bus 1 (750), one clock cycle after the first application of the control command. If a control command is applied to OPcode bus 0 (748), the constituent modules determine whether the applied control command is designated thereto. If a constituent module receives a control commands corresponding thereto, the module decodes the control command using a built-in decoder and takes a stand-by state for performing an operation designated in the control command. If the control command is also applied to the OPcode bus 1 (750) one clock cycle after being applied to the OPcode bus 0 (748), the operations designated in the control commands are performed for the first time. RT and ET signal lines (not shown in FIG. 8 for clarity) are allocated to represent whether a control code applied to the OPcode buses 0 (748) and 1 (750) is enabled.

Figure 9:
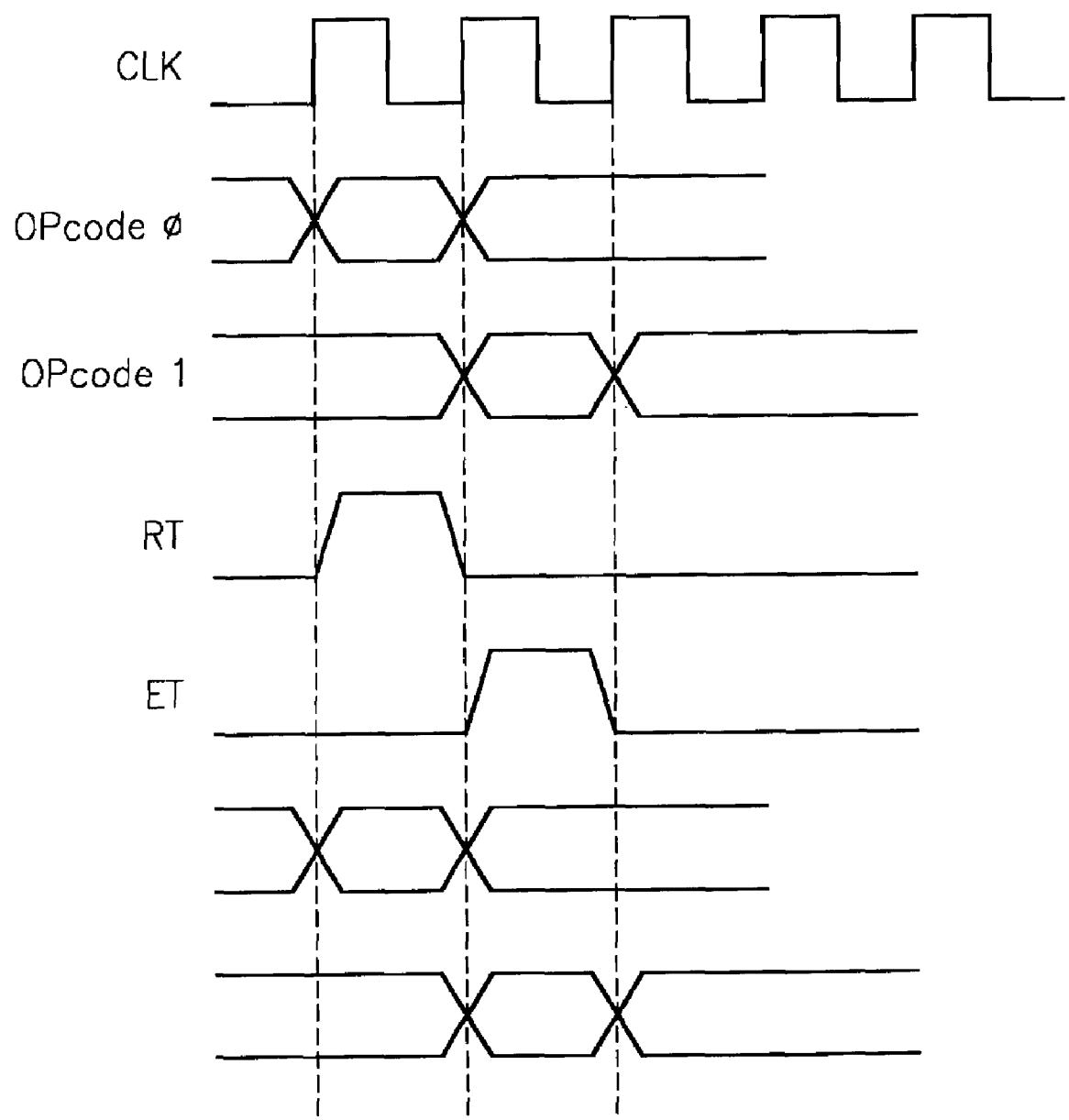
FIG. 9 is a timing diagram illustrating a process of receiving a control command and data in the voice recognition device of FIG. 7.

FIG. 9 is a timing diagram illustrating a process of receiving a control command and data in the voice recognition device of FIG. 7. Referring to FIG. 9, the top signal is a clock signal CLK, sequentially followed by a control command applied to the OPcode bus 0 (OPcode 748), a control command applied to the OPcode bus 1 (OPcode 750), an RT signal, an ET signal, data applied to the read bus A, and data applied to the read bus B.

If a control command is applied to OPcode bus 0 (748) and the OPcode bus 0 is enabled by the RT signal, one of the constituent modules of FIG. 7 recognizes and decodes the control command, entering into a standby state. Thereafter, if the same control command is applied to OPcode bus 1 (OPcode bus 750) and the OPcode bus 1 (750) is enabled by the ET signal, the constituent module of interest performs an operation designated in the control command. In other words, the constituent module of interest receives data from read buses A and B, performs the operation designated in the control command, and outputs the results of the operation via a write bus.

FIG. 10 is a table showing calculations performed in each function during the execution of a hidden Markov model algorithm. Referring to FIG. 10, the hidden Markov model (HMM) algorithm is executed with a plurality of calculation functions. A function gauss_outP requires the greatest number of calculations. Hence a hardware device in accordance with the exemplary embodiments of the present invention may be constructed to process the function gauss_outP, thus increasing the processing speed.

Referring now to Equation 8, the algorithm gauss_outP is composed of a subtraction, a squaring, multiplications, and a combination of these operations. Thus, for a general-purpose processor to process the algorithm gauss_outP, a substantial amount of time may be required.

FIG. 11 illustrates an algorithm of the first expression (y) of Equation 8. The algorithm of FIG. 11, expressed in C language, executes a computation in which a value Mean is subtracted from x, the result of the subtraction is squared, and the result of the squaring is multiplied by var. This computation may be repeated up to 13 times, for example, and the results for each repetition may be accumulated. In FIG. 11, x denotes the Feature shown in the first expression of Equation 8.

The second expression of Equation 8 (dbx) adds a weighted value (Gconst) in to the result of the first expression. However, since the weighted value is originally a negative value, the calculation for dbx results in a net subtraction from the result of the first expression (y).

The third expression (o_prob[m]) in Equation 8 represents an operation where the second expression is performed a given number of times, and dbx values obtained after the given number of iterations of the second expression are compared to each another to determine the three greatest dbx values.

Figure 12:
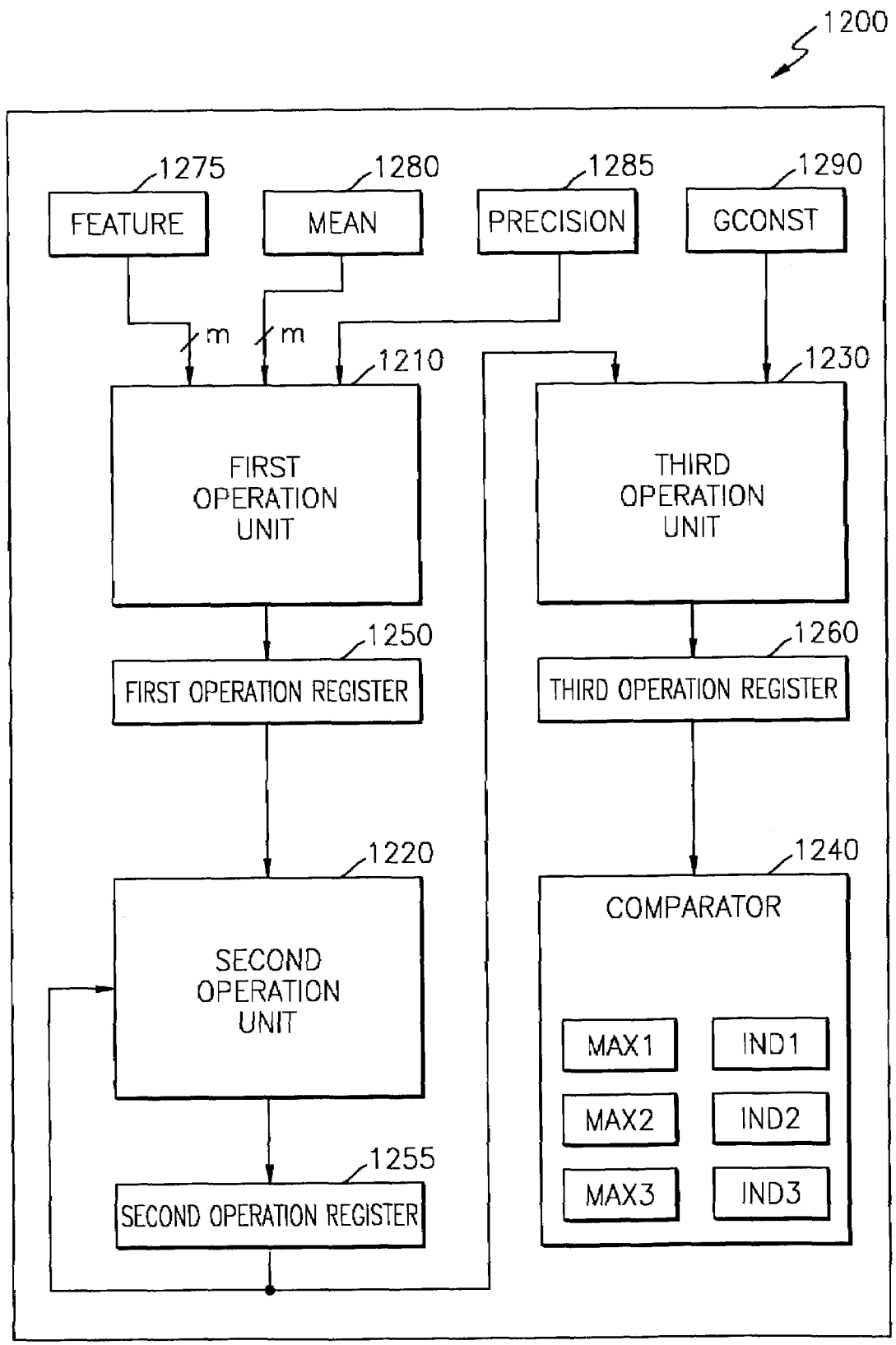
FIG. 12 is a block diagram of an observation probability calculation apparatus according to the exemplary embodiment of the present invention.

FIG. 12 is a block diagram of an observation probability calculation apparatus according to another exemplary embodiment of the present invention. Referring to FIG. 12, the observation probability calculation apparatus 1200 includes first through third operation units 1210, 1220, 1230, and a comparator 1240.

The first operation unit 1210 subtracts a value (Mean) from a parameter (Feature) and multiplies the result of the subtraction by Precision (a distribution degree, dispersion). Accordingly, first operation unit 1210 may include a subtracter and a multiplier (not shown).

Here, the parameter Feature represents energy and cepstrum for phonemes extracted from an input voice signal. The value Mean denotes a mean value of Feature parameters extracted from representative phonemes, and distribution degree Precision is a dispersion value of the value Mean.

The parameter Feature and the value Mean applied to the first operation unit 1200 are composed of m bits. To obtain the real distance between Feature and Mean, the result of the subtraction between Feature and Mean is multiplied by Precision. The output of the first operation unit 1210 is not directly applied to the second operation unit 1220, but stored in a first operation resister 1250, and then applied to the second operation unit 1220 in synchronization with a clock signal. Hence, this delayed application of the output of the first operation unit 1210 to the second operation unit 1220 may prevent the cycle of a clock signal from being restricted by an amount of time equal to a time required to perform operations in the first and second operation units 1210 and 1220. The restriction on cycle of the clock signal is due to the direct application of the output of the first operation unit 1210 to the second operation unit 1220.

The second operation unit 1220 squares the outputs of the first operation unit 1210 and accumulates N squaring results, which may be sequentially output. Hence, the second operation unit 1220 includes a squarer and an accumulator (not shown).

The outputs of the second operation unit 1220 are not directly applied to the third operation unit 1230, but are stored in a second operation resister 1255, and then applied to the third operation unit 1230 in synchronization with a clock signal. The second operation register 1255 feeds N squaring results, which may be output one after another, back to the second operation unit 1220. In this way, N accumulations may be executed, such as N=13, for example.

The first and second operation units 1210 and 1220 perform the computation of the first expression (y) of Equation 8, which is used to perform an observation probability calculation for a hidden Markov model (HMM) algorithm. In the first expression of Equation 8, i denotes representative types of phonemes, j denotes the number of parameters (Feature), and var denotes half a distribution degree (i.e., Precision/2).

In the first expression of Equation 8, the difference between Feature and Mean is squared, and the result of the squaring is then multiplied by var. however, the first and second operation units 1210 and 1220 multiplies the difference between Feature and Mean by Precision, and then squares the difference in order to increase operation speed.

Hence, a distribution degree (Precision) received by the first operation unit 1210 is $\sqrt{2\text{var}}$. In this case, although the second operation unit 1220 performs squaring, the result is the same as that of the first expression in Equation 8. Thus, a result of a computation $\Sigma$ (expressed in the first expression in Equation 8) is obtained from the output of second operation unit 1220.

The observation probability calculation apparatus 1200 does not require that the parameters and/or values Feature, Mean, Precision, and Gconst be stored in an external storage device (not shown) and recalled for computation. The observation probability calculation apparatus 1200 may include registers 1275, 1280, 1285, and 1290 which store Feature, Mean, Precision, and Gconst, respectively. Thus, computation speed may be increased.

The third operation unit 1230 subtracts Gconst from the output of the second operation unit 1220. Hence, the third operation unit 1230 may include a subtracter (not shown). The third operation unit 1230 performs the computation for the second expression (dbx) in Equation 8. Gconst is originally negative, but a positive Gconst is stored in register 1290 so that the subtracter (not shown) of the third operation unit 1230 can perform the second expression of Equation 8. The output of third operation unit 1230 is the probabilistic distance between Mean and Feature that is extracted from an input voice signal. The output of the third operation unit 1230 is not directly applied to the comparator 1240, but is stored in a third operation register 1260 and then applied to the comparator 1240, in synchronization with a clock signal.

The comparator 1240 stores the output of the third operation unit 1230, extracts L outputs from a plurality of outputs of the third operation unit 1230 based on order of magnitude of the extracted L outputs, and stores the extracted L outputs. The comparator 1240 performs the computation of the third expression (o_prob[m]) of Equation 8. L may be set to three (3), although any number of L outputs could be extracted, for example.

Comparator 1240 may include first through L-th registers MAX1, MAX2, and MAX3, which store L outputs from third operation unit 1230 in order of magnitude. Comparator 1240 may also include first through L-th index registers IND1, IND2, and IND3, which store outputs of third operation unit 1230 in an order in which the outputs are generated, for example.

Registers MAX1, MAX2, and MAX3 may initially be set with minimum values of the outputs from third operation unit 1230. An output of the third operation unit 1230, (initially input to the comparator 1240) may be compared to a value stored in second register MAX2, for example.

If the output of third operation unit 1230 is greater than the value stored in second register MAX2, the output is compared with a value stored in first register MAX1. If the output of the third operation unit 1230 is greater than the value stored in first register MAX1, the output is stored in first register MAX1. The value originally stored in first register MAX1 may be stored in second register MAX2, and the value originally stored in the second register MAX2 may be stored in third register MAX3. In other words, stored values may be shifted between MAX1, MAX2 and MAX3 based on a comparison to the output from third operation unit 1230.

A next (or new) output from third operation unit 1230 is input to comparator 1240 and compared with the value stored in second register MAX2. If the new output is greater than the value stored in second register MAX2, the new output is compared with the value stored in first register MAX1. Similarly, if the new output is greater than the value stored in first register MAX1, the new output is stored in first register MAX1. The previous output of third operation unit 1230 (stored in first register MAX1) is thus stored in second register MAX2, and the value stored in second register MAX2 is stored in third register MAX3, as described above.

By repeating this process, outputs from third operation unit 1230 may be stored in the first through third registers MAX1, MAX2, and MAX3 in order of magnitude. The order in which the outputs of the third operation unit 1230 are generated may thus be stored in the first through third index registers (IND1, IND2, and IND3). Accordingly, by including third operation unit 1230 and comparator 1240 in the observation probability calculation apparatus 1200, the probability values for cepstrum and delta cepstrum extracted from a voice signal may be compared and selected almost immediately after the probability values are calculated.

The observation probability calculation apparatus 1200 according to the present invention may enable a reduction in the number of calculations in an effort to increase operation speed. The operation of finding the maximum dbx value using a hidden Markov model algorithm (i.e., the third expression (in) of Equation 8) generally requires a substantially large number of calculations.

For example, if 100 dbx values are generated from the second expression of Equation 8, dbx values must be fetched 100 times from an external memory, and at least 100 subtractions must be performed in order to find the three greatest dbx values. However, in accordance with the exemplary embodiments of the present invention, subtractions and comparisons by third operation unit 1230 and comparator 1240 are performed simultaneously with an observation probability calculation, so that unnecessary cycles may be reduced and/or possibly eliminated.

In general, about 1,550 assembler instructions are needed to obtain 100 dbx values, and about 1,900 instructions are needed to perform a subtraction operation and a comparison and selection operation. As a voice recognition device should generate results with real time processing, processing speed is important. In accordance with the exemplary embodiments of the present invention, a subtraction operation and a comparison and selection operation can be performed by third operation unit 1230 and comparator 1240, in an effort to substantially reduce the number of unnecessary operations. Hence, operation speed suitable for real-time processing may be possible.

Additionally, power consumption may be reduced. In mobile products using a battery, the battery's durability is important. The durability of the battery relates to operation time. As the operation time lengthens, power is continuously consumed by unnecessary operations. For example, since a clock signal is input to all operation devices, the clock signal must be applied to all operation devices until necessary operations are finished. Accordingly, the exemplary embodiments of the present invention may enable a reduction in the number of operations, in an effort to reduce power consumption.

Further, the amount of memory used may be reduced. In the case where comparator 1240 is not included, all 100 dbx values must be stored in memory. A 3200-bit memory is required to store 100, 32-bit data. Because the capacity of internal memory of a chip containing a voice recognition device may be limited, memory typically must be attached externally to the chip.

The installation of new memory may substantially affect power consumption and processing speed of a voice recognition device. The observation probability calculation apparatus according to the present invention is designed so that three maximum probability values are stored in registers MAX1, MAX2, and MAX3 in one cycle after the observation probability calculation.

Moreover, the size of a voice recognition device is not greatly enlarged. Comparator 1240 has 1,627 gates, which does not even occupy 10% of the 19,300 gates used in the voice recognition device. However, if a new memory is included, the new memory may occupy a large part of the entire area of the voice recognition device. Thus, the voice recognition device in accordance with an exemplary embodiment of the present invention is not substantially enlarged, even when adopting the observation probability calculation apparatus described herein.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed:

1. An observation probability calculation apparatus, comprising:
   a first operation unit subtracting a mean of first parameters extracted from representative phonemes from one of a plurality of second parameters extracted from an input voice signal and multiplying the result of the subtraction by a distribution degree of the mean to obtain a first output;
   a second operation unit squaring the first output of the first operation unit and accumulating the result of the squaring N times to obtain a second output;
   a third operation unit subtracting a given weighted value from the second output of the second operation unit to obtain a third output; and
   a comparator storing the third outputs of the third operation unit, extracting L outputs from the third outputs of the third operation unit, and storing the extracted L outputs in order of magnitude;
   wherein the extracted L outputs are used for voice recognition.

2. The apparatus of claim 1, further comprising:
   a first operation register storing the first output and outputting the stored first output to the second operation unit;
   a second operation register storing the second output and outputting the stored second output to the third operation unit; and
   a third operation register storing the third output and outputting the stored third output to the comparator.

3. The apparatus of claim 1, further comprising:
   a plurality of registers storing the second parameter, mean, distribution degrees and weighted value.

4. The apparatus of claim 1, wherein the third output is a probabilistic distance between the mean of the plurality of first parameters and the one of the plurality of second parameters.

5. The apparatus of claim 1, wherein the second parameters include m bits, and
   wherein the mean includes m bits.

6. The apparatus of claim 1, wherein N is 13.

7. A voice recognition device including the observation probability calculation apparatus of claim 1.

8. The apparatus of claim 1, wherein the comparator comprises:
   first through L-th registers storing the extracted L outputs in order of magnitude; and
   first through L-th index registers storing an order in which the extracted L outputs stored in the first through L-th registers are generated.

9. The apparatus of claim 8, wherein L is 3.

10. The apparatus of claim 1, wherein the first and second operation units perform an observation probability calculation (y) in a hidden Markov model algorithm according to:

$$y = \sum_{i=0}^{1} \sum_{j=0}^{12} \mathrm{var}[i][j](\mathrm{Feature}\,[i][j] - \mathrm{Mean}\,[i][j])^2$$

wherein i is a factor representing the types of representative phonemes, j represents a number of the second parameters, and var denotes distribution degree of the mean.

11. The apparatus of claim 10, wherein var=$1/(2 * \sigma^2)$.

12. A computer-implemented method of calculating an observation probability, comprising:
   subtracting a mean of a plurality of first parameters extracted from a representative group of an input voice signal from one of a plurality of second parameters extracted from the input voice signal to obtain a result;
   multiplying the result to obtain a first output;
   squaring the first output; and
   accumulating the squared first output according to a number of the representative group and a number of the second parameters to obtain an observation probability value;
   wherein the observation probability value is used for voice recognition.

13. The method of claim 12, wherein the plurality of first parameters are extracted from representative phonemes of the input voice signal.

14. The method of claim 12, wherein the observation probability value is an accumulation of probabilities, and wherein each probability is representative of a sequence of syllables.

15. An observation probability calculation apparatus calculating an observation probability according to the method of claim 12.

16. The method of claim 12, wherein multiplying includes multiplying the result by a distribution degree to obtain the first output.

17. The method of claim 16, further comprising:
subtracting a given weighted value from the observation probability value to obtain a third output;
wherein a value of the third output is inversely proportional to the observation probability value.

18. The method of claim 17, wherein the third output is a probabilistic difference between the mean of the plurality of first parameters and the one of the plurality of second parameters, and
wherein the observation probability value increases as the probabilistic difference decreases.

19. The method of claim 17, further comprising:
extracting L outputs from the third output; and
selecting an L output having a greatest order of magnitude as a revised observation probability value.

20. The method of claim 19, wherein the revised observation probability value is a greatest probability that a sequence of syllables is recognized as the input voice signal.

21. A computer-implemented method of recognizing a voice signal, comprising:
subtracting a mean of a plurality of first parameters extracted from a representative group of an input voice signal from one of a plurality of second parameters extracted from the input voice signal to obtain a result;
multiplying the result to obtain a first output;
squaring the first output;
accumulating the squared first output according to a number of the representative group and a number of the second parameters to obtain a second output;
subtracting a given weighted value from the second output to obtain a third output;
extracting L outputs from the third output; and
selecting an L output having a greatest order of magnitude, the selected L output corresponding to the recognized voice signal.

22. A voice recognition device recognizing a voice signal according to the method of claim 21.

* * * * *